United States Patent
Saldana et al.

(10) Patent No.: US 6,938,817 B2
(45) Date of Patent: Sep. 6, 2005

(54) DIFFUSION BONDING METHOD FOR MICROCHANNEL PLATES

(75) Inventors: Miguel M. Saldana, Tempe, AZ (US); Jay Scott Tucker, Chandler, AZ (US); Michael J. Iosue, Phoenix, AZ (US)

(73) Assignee: Litton Systems, Inc., Los Angeles, CA (US)

( * ) Notice: Subject to any disclaimer, the term of this patent is extended or adjusted under 35 U.S.C. 154(b) by 0 days.

(21) Appl. No.: 10/708,889

(22) Filed: Mar. 30, 2004

(65) Prior Publication Data

US 2004/0191940 A1 Sep. 30, 2004

Related U.S. Application Data

(60) Provisional application No. 60/320,067, filed on Mar. 30, 2003.

(51) Int. Cl.$^7$ ............................. B23K 20/00; H04N 5/74
(52) U.S. Cl. ................. 228/194; 228/122.1; 348/217.1; 348/777
(58) Field of Search ............................. 228/122.1, 193, 228/194, 195; 348/217.1, 777; 313/124; 438/22

(56) References Cited

U.S. PATENT DOCUMENTS

| | | | |
|---|---|---|---|
| 5,514,928 A | | 5/1996 | Niewold ............... 313/105 CM |
| 5,573,173 A | | 11/1996 | van der Wilk et al. ..... 228/194 |
| 5,632,436 A | | 5/1997 | Niewold ..................... 228/121 |
| 5,683,828 A | * | 11/1997 | Spear et al. ................... 429/13 |
| 5,994,824 A | | 11/1999 | Thomas et al. ...... 313/105 CM |
| 6,040,657 A | | 3/2000 | Vrescak et al. ........... 313/544 |
| 6,051,331 A | * | 4/2000 | Spear et al. ................ 429/34 |
| 2004/0003455 A1 | * | 1/2004 | Tonovich et al. .............. 431/7 |
| 2004/0019140 A1 | * | 1/2004 | Saldana et al. ............... 438/22 |

* cited by examiner

Primary Examiner—Kiley S. Stoner
(74) Attorney, Agent, or Firm—Marsteller & Associates, P.C.

(57) ABSTRACT

A microchannel plate (MCP) (50) and a dielectric insulator (80) are deposited with a thin film (54, 84) using a suitable metal selected for optimum diffusion. The metallized MCP (50) and dielectric insulator (80) are then aligned and placed in a bonding fixture (36) that provides the necessary force applied to the components to initiate a diffusion bond. The bonding fixture (36) is then placed in a vacuum heat chamber to accelerate the diffusion bonding process between the MCP (50) and the dielectric insulator (80).

12 Claims, 4 Drawing Sheets

DIFFUSION BONDING METHOD FOR MICROCHANNEL PLATES

CROSS REFERENCE TO RELATED APPLICATIONS

This application claims the benefit of U.S. provisional application Ser. No. 60/320,067, filed Mar. 30, 2003, entitled DIFFUSION BONDING METHOD FOR MICROCHANNEL PLATES.

BACKGROUND OF INVENTION

1. Technical Field

The invention relates to the field of electronic devices having microchannel plates (MCPs), and more particularly to methods of bonding a microchannel plate (MCP) to a dielectric insulator.

2. Background Art

Known types of MCPs are typically made from a resistive glass that is coated on each side with a conductive material. A high voltage can then be applied across the electrodes to facilitate electron amplification.

Conventional MCPs frequently may be sandwiched between two electrodes (an input and an output) that are separated by a ceramic shim. This known design "hides" the input surface of the MCP and does not allow for interfacing with the spacer.

The present invention permits interfacing MCPs with a bonded spacer formed from a dielectric insulator.

While the above cited references introduce and disclose a number of noteworthy advances and technological improvements within the art, none completely fulfills the specific objectives achieved by this invention.

SUMMARY OF INVENTION

In accordance with the present invention, a method of bonding a Microchannel Plate (MCP) suitable for electron amplification to a dielectric insulator for use in electronic devices such as image intensifier tubes is described. Applicable dielectric insulator materials include, but are not limited to, sapphire and silicon nitride. Mechanical hold downs or retainers are not desired. Bonding involves brittle material with low shear strength. The bonding method does not require solder or brazing materials.

The MCP and the dielectric insulator are deposited with a thin film using suitable metal(s) selected for optimum diffusion. Suitable metal(s) include, but are not limited to, Gold, Silver, and Copper. Gold thin film depositions have been successfully used to form the bond between the MCP and the dielectric insulator.

The metallized MCP and dielectric insulator are aligned and placed in a bonding fixture. The bonding fixture provides the necessary force applied to the components to initiate a diffusion bond. The bonding fixture is then placed in a vacuum heat chamber to accelerate the diffusion bonding process between the MCP and the dielectric insulator.

An object of the present invention is to bond an MCP to a dielectric insulator without the use of retainers or solder/braze materials. The bonding method involves brittle material with low shear strength. The MCP to dielectric insulator must not change under thermo-mechanical stresses of at least 400 degrees C. and 500 g's of shock.

These and other objects, advantages and features of this invention will be apparent from the following description taken with reference to the accompanying drawings, wherein is shown the preferred embodiments of the invention.

BRIEF DESCRIPTION OF DRAWINGS

A more particular description of the invention briefly summarized above is available from the exemplary embodiments illustrated in the drawings and discussed in further detail below. Through this reference, it can be seen how the above cited features, as well as others that will become apparent, are obtained and can be understood in detail. The drawings nevertheless illustrate only typical, preferred embodiments of the invention and are not to be considered limiting of its scope as the invention may admit to other equally effective embodiments.

DETAILED DESCRIPTION

So that the manner in which the above recited features, advantages, and objects of the present invention are attained can be understood in detail, more particular description of the invention, briefly summarized above, may be had by reference to the embodiment thereof that is illustrated in the appended drawings. In all the drawings, identical numbers represent the same elements.

A microchannel plate (MCP) 50 and a dielectric insulator 80 are deposited with a thin film using one or more suitable metals or metallic alloys selected for optimum diffusion on opposing and compatible exterior faces or surfaces. Suitable metal or metals include, but are not limited to, gold, silver, and copper. Gold thin film depositions have been successfully used to form the bond between the MCP 50 and the dielectric insulator 80.

The metallized MCP 50 and dielectric insulator 80 are aligned and placed in a bonding fixture F. The bonding fixture F provides the necessary force 26 applied to the components to initiate a diffusion bond. The bonding fixture F is then placed in a known vacuum heat chamber V to accelerate the diffusion bonding process between the MCP 50 and the dielectric insulator 80 through the application of a desired vacuum or temperature.

The diffusion bonding process described provides an adequate bond between the MCP 50 and dielectric insulator 80.

Both the MCP 50 and the dielectric insulator 80 are deposited with a thin film using a suitable metal or alloy selected for optimum diffusion. Suitable metals include from the following, but are not limited to, gold, copper, and silver.

Figure 5:
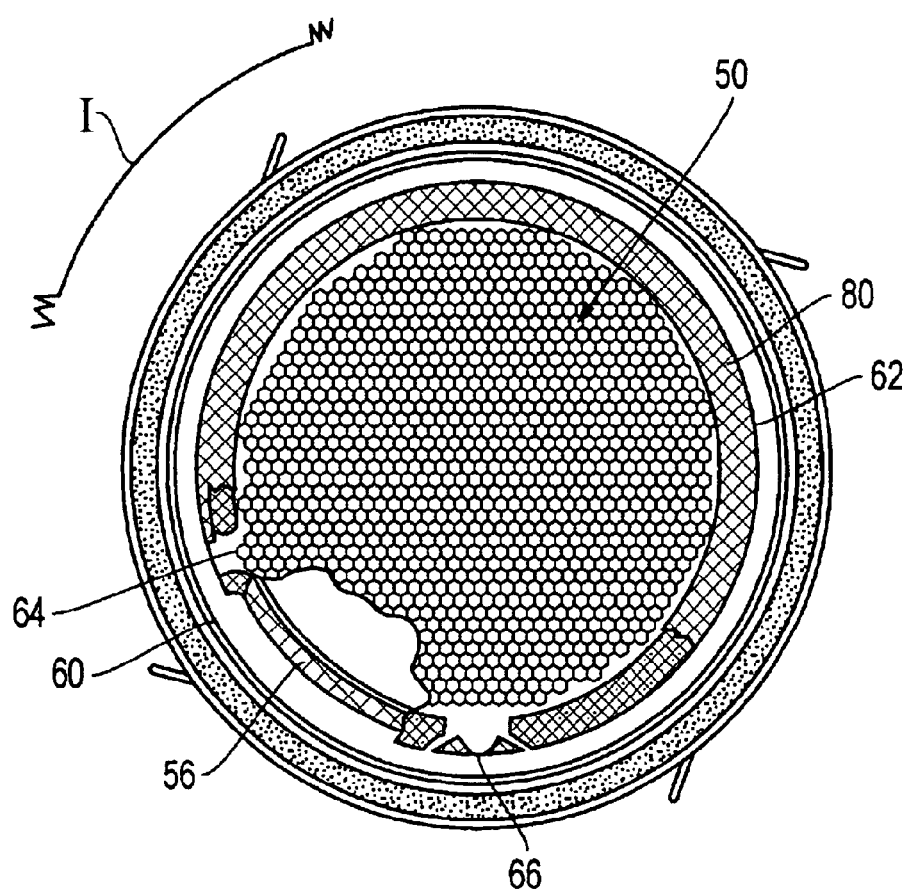
FIG. 5 is a top view of a microchannel plate and dielectric spacer inserted body unit.

At the completion of the thermal-mechanical cycle, the bond is secure and the part is ready for use in a known device such as a known type of image intensifier tube I (shown schematically in FIG. 5). No additional annealing or compression cycles are generally required.

Figure 3:
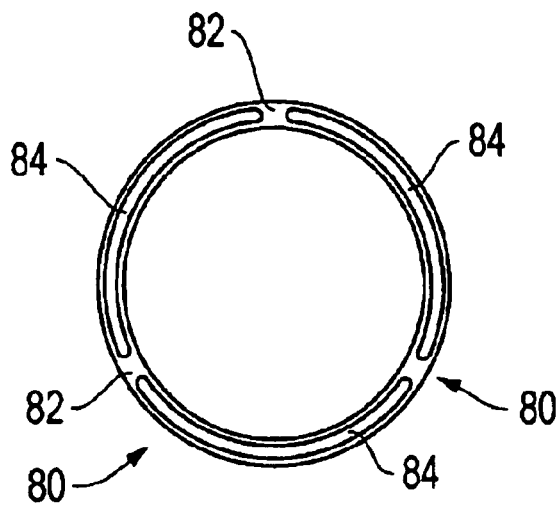
FIG. 3 is a top view of a dielectric insulator.

Referring to FIG. 3, the dielectric insulator 80, such as a sapphire ring, has a metallized bonding surface or side 82 having a thin-film metal coating 84 bonded thereto.

Figure 4:
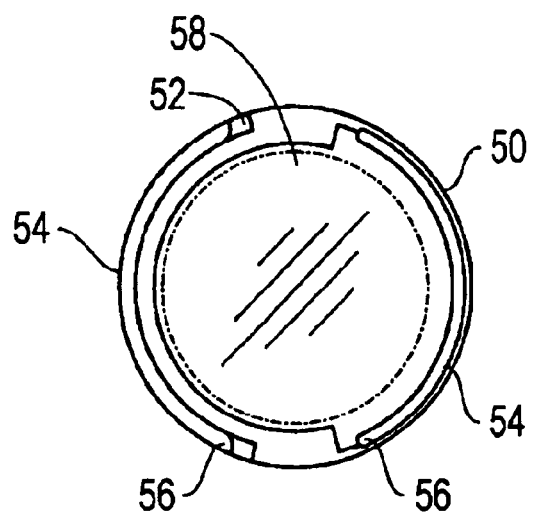
FIG. 4 is a top view of a microchannel plate.

A MCP 50 is shown in FIG. 4 with one side or face 52 being metallized with a thin-film metal coating 54. Preferably, both opposing faces of the MCP 50 have similar metal coatings applied. Also, the bonding surface 82 of the dielectric insulator 80 is compatible with the metallized face 52 of the MCP 50.

Traces 56 of gold or other chosen metal may be observed. A pattern 58 of chromium or other metal used in manufacture may be formed on the MCP 50.

In FIG. 5 a MCP body member 60, which may be a multi-layered ceramic body, is depicted as being formed having a selected metal, such as gold, bump 62 bonded. This is a standard solid state process and preferably is applied to both the opposing input and output faces 64. An optional bias mark 66 may be applied for ease of alignment during the manufacturing process.

Generally, the dielectric insulator 80, MCP 50, and MCP body unit 60 are assembled as outlined below and placed in a vacuum oven V. The components preferably remain in the vacuum oven V for a predetermined period of time before the oven temperature is slowly returned to room temperature for removal of the fixture or fixtures F.

Advantages of the Present Invention Include a. There are no known methods for bonding an MCP to a dielectric insulator.

b. Provides a bonding method for bonding an MCP to a dielectric insulator.

c. Provides a small footprint for bonding.

d. A heat cycle around 400 degrees C. is used to enhance the diffusion bond rather than degrade the bond or components.

e. The open input face of the MCP allows for improved design of the cathode input window by reducing the depth of the cavity.

f. A dielectric insulator allows for improved design of the proper input spacing gap between the photocathode and the MCP.

Additionally, the requirement of bonding an MCP 50 to a dielectric insulator 80 is believed to be unique with no known previous methods. The present invention provides a new bonding method for bonding an MCP 50 to a dielectric insulator 80. The bonding present technique will allow for improved design of controlling the spacing of the photocathode and MCP 50 in a device such as an image intensifier tube.

Figure 1:
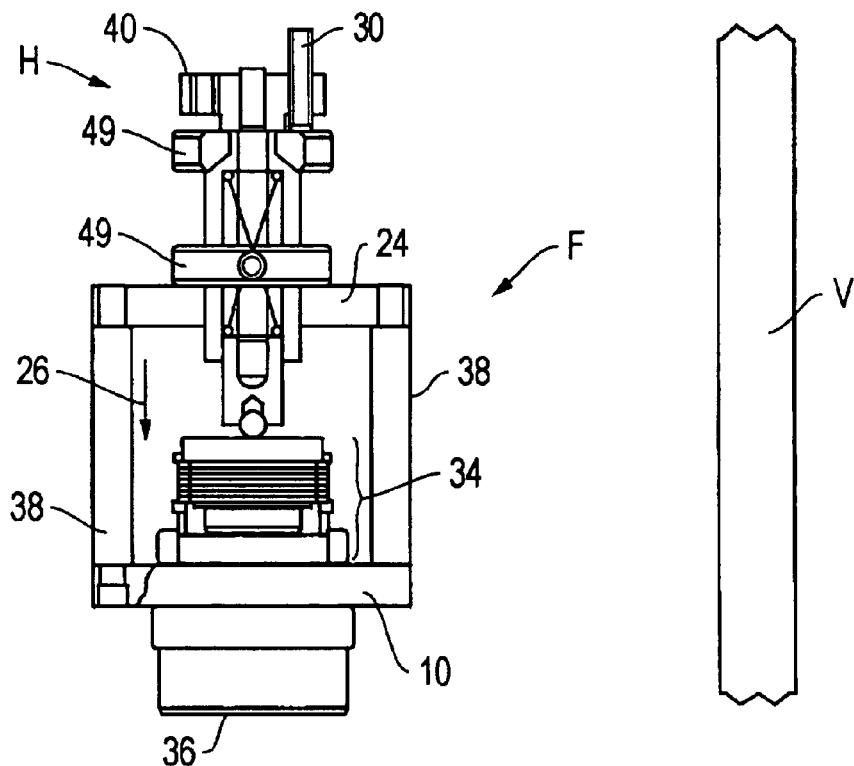
FIG. 1 is a frontal view of an assembly fixture for the present invention.
Figures 1A, 1B:
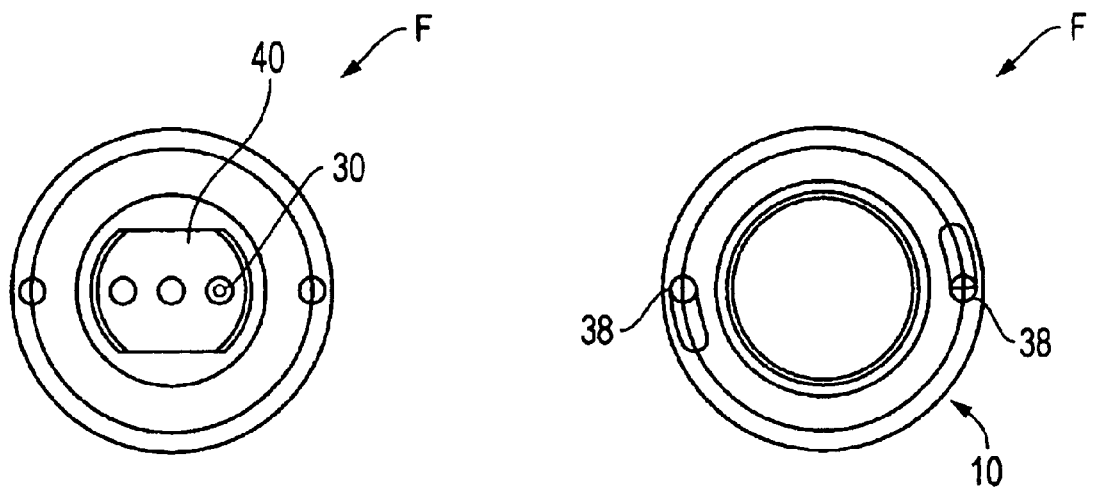
FIG. 1a is a top view of the fixture of FIG. 1.
FIG. 1b is a bottom view of the fixture of FIG. 1.
Figure 2:
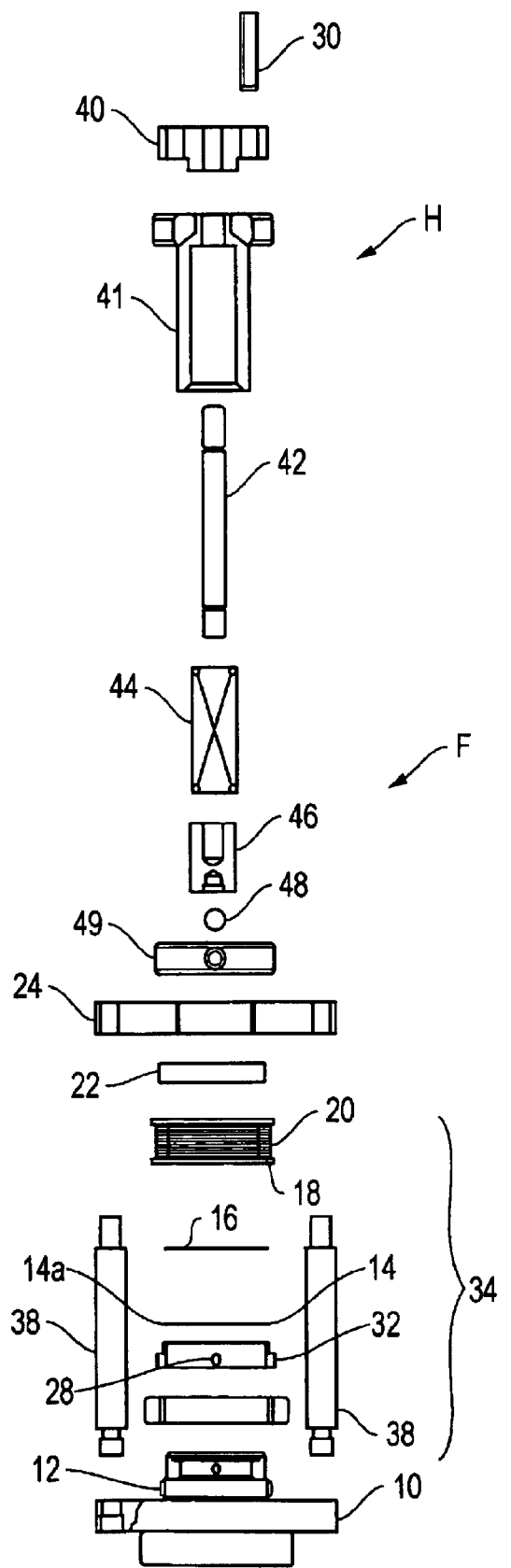
FIG. 2 is an exploded view of the assembly fixture of FIG. 1.

Referring particularly to FIGS. 1 and 2, the assembly sequence may include:

a. the compression bond fixturing base 10 and the compression bond fixturing ring/base unit 12 are assembled;

b. a dielectric insulator 80, such as a sapphire washer 14, is placed on top of an compression bond fixturing ring/base unit 12 with the gold metallized surface 14a facing up;

c. an MCP 16 having both sides metallized with a metal such as gold is placed on top of the sapphire washer 14 aligning gold bonding traces 56 to match so that maximum gold is in contact between the MCP 16 and the dielectric insulator 14;

d. an MCP body 20 having a gold or other selected metal bump 18 bonded is placed on top of the MCP 16 using bias marks on both the MCP 16 and MCP body 20 for alignment;

e. an upper compression bond disk unit 22 is placed on top of the MCP body 20;

f. an upper or top plate unit 24 of the compression bond fixture 36 is assembled with the lower half portion or base 10 of the fixture without contact or force being made at this point;

g. a desired slight force 26 is then applied to the top plate fixturing 22;

h. a lower set screw 28 is released allowing an alignment ring unit 32 to drop and no longer make contact with the MCP body 20 (this step may not be necessary during removal of components); and i. a pre-selected force is applied to the compression unit 34 using an upper set screw 30 of the compression bond fixture 36.

Disassembly is done in the reverse order slowly using the set screw 28 to release the pressure before continuing.

Generally, one or more rigid posts 38 maintain the separation of the lower base 10 and the upper plate unit 24. A handle assembly H for setting and releasing the bonding pressure may include a handle or knob 40 with the upper set screw 30 operably connected to a handle cylinder 41, a shaft 42, spring 44, and a piston or cup unit 46 that restrains a ball bearing 48. A locking nut 49 may optionally cooperate with the handle assembly H to lock the fixture 36 at a desired compression force level.

The foregoing disclosure and description of the invention are illustrative and explanatory thereof, and various changes in the size, shape and materials, as well as in the details of the illustrated construction may be made without departing from the spirit of the invention.

What is claimed is:

1. A method for bonding a microchannel plate to a dielectric insulator comprising the steps of:

the microchannel plate and the dielectric insulator are deposited with a thin film consisting of a suitable metal selected for optimum diffusion elevated temperatures and pressure over compatible exterior faces;

the metallized MCP and dielectric insulator are aligned with the dielectric insulator disposed about the periphery of the microchannel plate and placed in a bonding fixture and a compression force is applied sufficient for the compatible exterior faces of the MCP and dielectric insulator to initiate a diffusion bonding process at a selected temperature; and the bonding fixture securing the compressed metallized MCP and dielectric insulator is placed in a vacuum heat chamber for accelerating the diffusion bond between the MCP and the dielectric insulator.

2. The method of claim 1 wherein the metal suitable for the deposition of the thin film is selected from the group consisting of gold, silver and copper.

3. The method of claim 1 wherein the dielectric insulator is a sapphire ring.

4. A microchannel plate body assembly of the type including a microchannel plate suitable for electron amplification comprises:

a microchannel plate (MCP) having a bonding surface, and a dielectric insulator unit having a bonding surface compatible with e bonding surface of the MCP; the dielectric insulator being disposed about the periphery of the microchannel plate; and the bonding surface of the MCP being diffusion bonded to the compatible diffusion bonding surface of the dielectric insulator.

5. The invention of claim 4 wherein the dielectric insulator is a s sapphire ring.

6. The invention of claim 4 wherein the compatible surface of the MCP has a thin metallic film deposited thereon prior to bonding of the MCP and the dielectric insulator.

7. The invention of claim 4 wherein the compatible surface of the dielectric insulator has a thin metallic film deposited thereon prior to bonding of the MCP and the dielectric insulator.

8. The invention of claim 6 wherein the thin film includes a metal selected from the group consisting of gold, silver, and copper.

9. The invention of claim 7 wherein the thin film includes a metal selected from the group consisting of gold, silver, and copper.

10. The invention of claim 4 wherein the microchannel plate body assembly is adapted for use in an image intensifier tube.

11. The method of claim 1 wherein the dielectric insulator is composed of material selected from the group consisting of sapphire and silicon nitride.

12. The invention of claim 4 wherein the dielectric insulator is composed of material selected from the group consisting of sapphire and silicon nitride.

\* \* \* \* \*